Jan. 21, 1958    F. C. G. BERTHIEZ    2,820,343
LOCKING SYSTEM
Filed Dec. 9, 1955
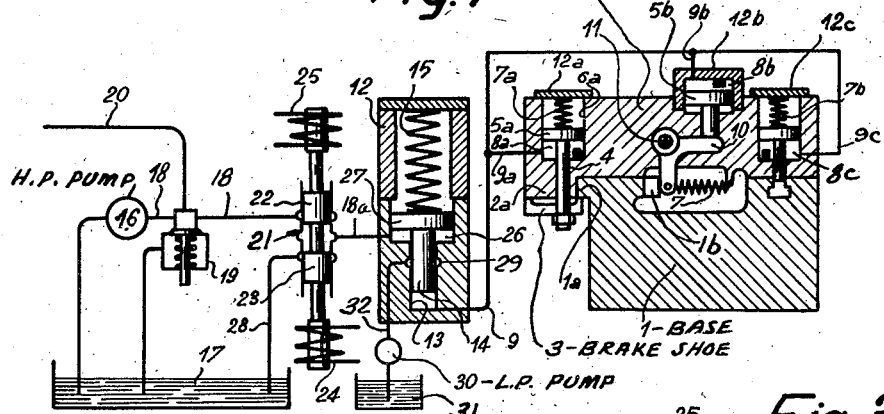
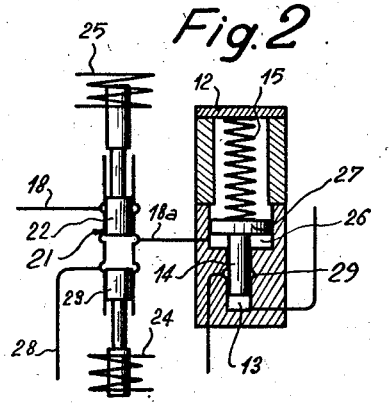
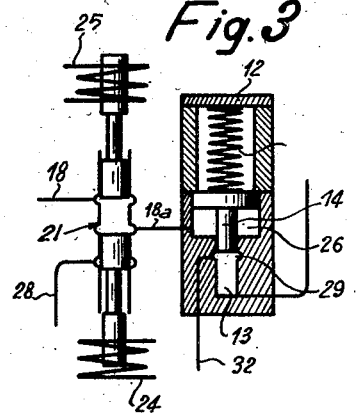
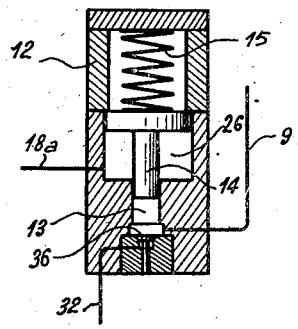
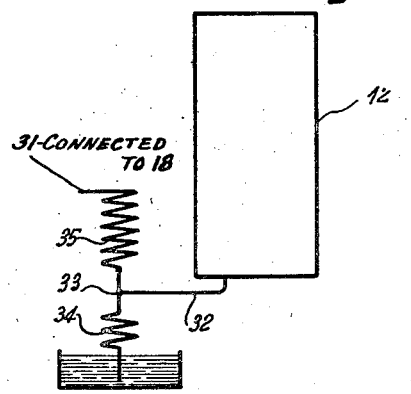
INVENTOR
Frederick Charles Gilbert Berthiez
By
ATTORNEY

United States Patent Office 2,820,343
Patented Jan. 21, 1958

2,820,343
LOCKING SYSTEM

Frederick Charles Gilbert Berthiez, Lamorlaye, France, assignor to Societe Anonyme des Anciens Etablissements Charles Berthiez, Paris, France Application December 9, 1955, Serial No. 552,194

Claims priority, application France July 20, 1955

14 Claims. (Cl. 60—54.5)

This invention relates to locking systems, and more especially to hydraulically operated locking systems of a type applicable to the locking of one or more of the relatively movable components of a machine tool assembly.

In machine tools, after the tool and/or workpiece supporting elements have been set at the requisite relative positions with respect to one another, by pivotal or sliding displacement as the case may be, it is necessary that such elements be firmly locked or clamped to prevent any further relative motion between them. It is one object of this invention to provide novel and advantageous means to that end. In its broader aspects however, the invention is not limited to this particular utilization and a generic object is the provision of novel and improved locking means usable in connection with relatively movable machine components of any description.

Other objects include the provision of locking means for relatively movable machine components, which means are hydraulically operated; the provision of such means which do not require the application of power during those periods wherein said components are to be locked, but only during the times when the components are to be released for relative motion; the provision of locking means in which a permanent static force is exerted during the locking periods, and auxiliary pressure means are adapted to be selectively brought into action to counteract said permanent force when desired to release the locking action; the provision of locking means of the type just specified in which the auxiliary pressure means is hydraulic in character; the provision of such hydraulic locking system which will be entirely reliable in that a positive locking effect will be had no matter how long the locking system is retained in its operative or locking condition, despite the presence of unavoidable leakage; the provision, in this latter connection, of a hydraulic locking system of the specified type, including means for automatically replenishing the supply of hydraulic pressure fluid each time the auxiliary hydraulic pressure means is operated for releasing the locking action, thereby compensating for any leakage that may have occurred during the preceding locking period; and finally the attainment of the above enumerated objects within a system well suited for use in connection with modern machine tools.

The above and further objects and advantages of the invention as well as the characteristic features thereof will appear as the disclosure proceeds. The invention will now be described in greater detail with reference to the accompanying diagrammatic drawings, which show one embodiment thereof by way of illustration but not of limitation; in the drawings:

Figure 1 is a diagrammatic showing, mainly in vertical cross section and partly in schematic form, of an improved hydraulic locking system;

Figure 2 is a similar showing of the distributor or control component of the system of Figure 1, in the "locked" position;

Figure 3 is a view similar to Figure 2 with the control device in the "release" position;

Figure 4 illustrates a modified form of the control device;

Figure 5 is a schematic illustration of a modified oil replenishing arrangement for the compensation of leakage.

Referring first to Figure 1, there is diagrammatically shown part of a machine tool assembly including a base 1 and a carriage 2 adapted for horizontal sliding movement relative to said base in a direction perpendicular to the plane of the paper. Cooperating slideways are provided on the base 1 and carriage 2 and include a vertical longitudinal surface 1a formed along a side of the base, and a complementary vertical surface formed on a depending side portion 2a of the carriage 2. Means for locking against relative motion of carriage 2 over base 1 are provided in the form of a brake shoe 3 supported on the lower end of a vertical rod 4 which extends slidably through the carriage portion 2a and carries at its upper end a piston 5a arranged for operation within a cylinder 6a, 8a formed within the carriage. A compression spring 7a interposed between the upper face of piston 5a and a top cover plate 12a sealing the cylinder biases the piston assembly towards a lower position in which brakeshoe 3 is disengaged from the under surface of carriage portion 2a, thereby releasing the carriage for free motion relative to the base 1. However, the piston assembly can be forced upwards agains the action of spring 7a, in order to force the brakeshoe 3 against the carriage surface and to lock the carriage upon the base. This is done by delivering a hydraulic fluid under high pressure into the lower chamber 8a of cylinder 6a through a conduit 9a, at a pressure high enough to overcome the biasing force of spring 7a.

The figure illustrates two further devices of a generally similar character to the one just described. One of these further devices is partly shown on the far right of the machine tool assembly and another toward the center thereof. This last mentioned device is constructed somewhat differently from the one described above. Namely, instead of having its biasing spring interposed between its piston 5b and top cylinder cover 12b, the spring in this instance, shown at 7, is made to act through a bell crank lever 10 pivoted at 11 in the carriage 2 upon the lower end of the piston rod to bias the piston assembly upwards; application of pressure fluid through inlet pipe 9b into the upper cylinder chamber forces the piston 5b downwards, acting at the same time through lever 10 to urge the carriage toward the right relative to the base 1, the lower end of the bell crank 10 bearing against abutment 1b. This constitutes a wear-taking arrangement adapted to maintain the sliding engagement between the carriage and base at the surface 1a regardless of wear on the slideways.

It will be understood that, while three separate locking devices have been illustrated, any desired number thereof may be utilized in a given machine according to requirements. The cylinder of each such device is supplied with pressure fluid through an inlet connected thereto, such as 9a, 9b, 9c, all such inlet conduits being supplied in parallel from a common pressure line 9. The line 9 normally has a high pressure permanently maintained therein, sufficient to overcome the biasing forces of all the springs such as 7, 7a, 7b, so that the respective locking devices are normally retained in their applied or locking condition, e. g., a condition such that the brakeshoe 3 is applied against the under face of carriage portion 2a and the shoulder on the base 1 to prevent carriage displacement.

For normally maintaining a high pressure in the line 9, this line connects with a pressure chamber 13 formed in the body of a control device or valve 12; the top of the pressure chamber 13 being defined by the bottom end of a piston rod or plunger 14 having a piston 27 secured on its upper end within a control cylinder 26. The piston 27 is urged in a downward direction by a powerful compression spring 15 acting upon its upper face.

Thus it will be seen that the spring 15 provides a permanent source of static or potential energy which is effective to sustain at all times the requisite high degree of pressure on the body of fluid filling pressure chamber 13, pressure line 9, delivery lines 9a, 9b, 9c, and the respective locking cylinder chambers such as 8a, 8b, 8c. The pressure in the chamber 13 maintained by the spring 15 may be about 1500 p. s. i. for example.

In order to release the locking devices, hydraulic pressure is developed in the control cylinder 26 beneath the piston 27 by means of an hydraulic system now to be described. This system comprises a high pressure hydraulic pump 16 e. g. of the volume type which takes in hydraulic fluid, e. g. oil, from a sump 17, and discharges it under pressure through a line 18. Shown interposed in the discharge line 18 is a pressure relief valve 19 so adjusted that when the delivery pressure from pump 16 exceeds a predetermined value, of e. g. 300 p. s. i., the excess pressure fluid is discharged into the sump. The drawing further shows a second pressure delivery line 20 branching off from the relief valve 19, to indicate that the pump 16 may serve to supply pressure to any other desired fluid operated systems.

The discharge line 18 leading from relief valve is connected with the inlet into an electromagnetic valve 21 having two outlets. One outlet 18a leads into the cylinder 26 under the piston 27 in control device 12, while the other outlet, designated 28, leads into the sump 17. Communication between the inlet and either outlet of the valve 21 is controlled by a dual piston valve assembly including the two spaced pistons 22 and 23 adapted to be axially displaced in either direction away from the neutral or null position shown by selective energization of the solenoid coils 24, 25. In the null position illustrated, the pressure line 18 from pump 16 is closed off by the pistons 22—23 both from the control cylinder 26 and from sump line 28. Energization of one solenoid, e. g. 24, shifts the dual piston valve upwards to deliver the 300 p. s. i. pressure from pump 16 into control cylinder 26, while energization of the other solenoid shifts the dual piston valve downwards to relieve the pressure to the sump.

The ratio of the effective area of piston 27 to that of the lower end face of piston rod or plunger 14 is made large enough to assure that the comparatively low, e. g. 300 p. s. i., pressure delivered into cylinder 26 from pump 16 will overcome the force of spring 15 and push the piston and plunger assembly 27—14 upwards, thereby relieving the high pressure in chamber 13 and pressure line 9 and releasing the respective locking devices.

Thus, it will be understood that hydraulic energy from the auxiliary control circuit including pump 16 is expended only at those times when it is desired to suspend the locking action upon the relatively movable parts of the machine tool, whilst at other times the permanent locking pressure is developed by the static source of potential energy constituted by the spring 15.

It will be evident, however, that, in practice, the high pressure of say 1500 p. s. i. in the sealed body of fluid contained in chamber 13 and the pressure lines 9, 9a, 9b, 9c and locking cylinders 6a, 8a cannot be maintained over long periods of time without occurrence of substantial leakage due to inevitable sealing imperfections. Such leakage is at first immaterial since it will be automatically taken up by a gradual downward displacement of the piston 27 under the pressure of spring 15, so that the volume of pressure chamber 13 will gradually diminish to maintain the locking pressure in the sealed body of fluid unchanged. Inevitably, however, there will come a time when further downward motion of the piston and plunger assembly 27—13 is arrested by mechanical abutment, whereupon further leakage must necessarily result in an objectionable drop in the locking pressure of the system. Means are provided in accordance with this invention for obviating this difficulty.

It will be understood that the above mentioned leakage from the high-pressure circuit of the system will occur during those periods when the locking pressure is applied, that is, when no hydraulic pressure is applied from pump 16 into chamber 26. In accordance with the invention therefore, means are provided for delivering make-up fluid into the high-pressure circuit each time the system is actuated for releasing the locking action. In this way, any fluid that has leaked off from the high-pressure circuit during the preceding locking period is automatically compensated for. The make-up means comprise an additional hydraulic circuit, comprising a low pressure pump 30 adapted to deliver through line 32 fluid from a sump 31 into an annular inlet groove 29 formed in the control body 12 at a location such that said groove is only uncovered by the bottom end face of piston rod or plunger 14 after the latter has travelled a predetermined vertical distance during its up-stroke upon delivery of fluid pressure to the control cylinder 26. The pressure delivered by pump 30 need only have a relatively low value, say about 15 p. s. i., since the pressure obtaining within the chamber 13 is quite low at the time the inlet 29 is uncovered. Thus, the next time that locking pressure is applied to the system through discharge of the pressure in control cylinder 26 to the sump 17 by actuation of the electro-magnetic valve in a downward direction the high-pressure circuit including chamber 13 and pressure lines 9, 9a, 9b, 9c will have been replenished with fluid and initial high pressure operating conditions will have been restored by the action of spring 15.

The parts described above are so dimensioned, including the capacity of pressure chamber 13 and position of make-up fluid inlet 29, with due regard to the existing leakage rate from the high-pressure circuit, that the requisite locking pressure will be maintained within the chamber 13 for the maximum periods of time that it may be required to lock the movable components of the machine.

Figure 5 illustrates a modification of the leakage compensating system wherein the make-up fluid delivery pressure, rather than being generated by a separate low-power high pressure pump 30, is derived from the pump 16 by means of a hydraulic pressure-divider system. In this modification, there are provided two hydraulic resistances 34 and 35 in series with each other, resistance 34 being connected at one end to the sump and the opposite end of resistance 35 being connected through a line 31 to the pressure line 18 or line 20. The make-up fluid inlet line 32 is connected to the common junction 33 of the two resistances which are so proportioned as to produce the requisite moderate pressure of e. g. 15 p. s. i. in the line 32.

Figure 4 illustrates a modification of the control device 12 which only differs from the control device described above in connection with Figures 1–3 in that the make-up fluid delivery into chamber 13, rather than being effected through an annular inlet groove 29 uncovered in the uppermost position of the plunger 14 is effected instead directly into the bottom of the chamber 13 through a one-way check-valve device 36 preventing the outflow of fluid from the chamber 13 and adapted to allow inflow into the chamber when the pressure obtaining therein has dropped below the pressure value present in the make-up fluid delivery line 32. It will be evident that the valve construction shown in Figure 4 may be used either with the arrangement of Figures 1–3 or with that of Figure 5.

Many other modifications may, of course, be made in the details of the system described without departing from the spirit and scope of the invention. Thus, in place of an electro-magnetically operated valve such as the one shown in Figure 1, any suitable reversible valve device, e. g. one directly operated manually by the operator, may be used with equivalent results. In cases where the pump 16 serves no other purpose than that of energizing the locking system of the invention rather than constituting a multiple purpose pump, e. g. the pump powering the hydraulic plant of a machine-tool or the like, the valve 21 may be completely omitted.

I claim:

1. In a machine having relatively movable parts, locking means comprising a cylinder connected with one part, a piston movable in the cylinder between two positions, brake means connected with said piston and adapted to engage said parts to prevent relative motion between the parts in a given position of said piston and to permit such relative motion in the other position of said piston, a high-pressure hydraulic circuit including a fluid line connected with said cylinder and adapted when a predetermined high pressure is present in said circuit to move the piston to its given position, means in said circuit defining a chamber provided with a movable wall, force means normally exerting pressure on said wall to maintain said predetermined high pressure in said chamber and in said circuit, a further hydraulic circuit including a further fluid line connected to said means defining said chamber for applying to said movable wall hydraulic pressure in a direction reverse from the pressure of said force means, and means for selectively applying and releasing pressure to and from said further fluid line.

2. In a machine having relatively movable parts, a cylinder connected with one part, a piston movable in the cylinder between two positions, brake means connected with said piston and adapted to engage said parts to prevent relative motion between the parts in a given position of the piston and to permit such relative motion in another position of said piston, a fluid line connected with said cylinder for moving the piston to said given position on application of pressure to the fluid in said line, means providing a chamber connected with said line, a member having a surface defining a wall of said chamber and movable in said chamber for varying the volume of the chamber and hence the pressure applied on the fluid in said line, force means operatively connected to said member and normally urging said member inwardly of said chamber to maintain a predetermined high pressure on the fluid in said chamber and in the line, and control means operable to urge said member outwardly of the chamber against said force means.

3. In a machine with relatively movable parts, a cylinder connected with one part, a piston movable in the cylinder between two positions, brake means connected with said piston and adapted to engage said parts to prevent relative motion between the parts in a given position of the piston and to permit such relative motion in the other position of said piston, a fluid line connected with said cylinder for moving the piston to said given position on application of pressure to the fluid in said line, means providing a chamber connected with said line, a member having a surface defining a wall of said chamber and movable in said chamber for varying the volume of the chamber and hence the pressure in the line, a control cylinder, a control piston slidable in said control cylinder and connected with said member for movement therewith, spring means acting on one side of said control piston to urge said control piston to move said member inwardly of said chamber for applying pressure to the fluid in said line, an inlet into the control cylinder on the other side of said control piston from said spring means, and hydraulic circuit means connected with said inlet and operable to establish a pressure at said other side of said control piston for urging said piston and said member outwards of said chamber for relieving the pressure of the fluid in said line.

4. The arrangement claimed in claim 3, wherein the effective area of said member surface defining said movable wall is substantially smaller than the effective area of said control piston.

5. In a machine tool having relatively movable parts, locking means operatively connected to said parts and including a fluid-pressure actuator having a member movable to and from a position for preventing relative motion between said parts, a first pressure fluid circuit connected with said actuator for urging it to said position on establishment of a predetermined high pressure in said circuit, pressure means movable in a given direction for normally exerting pressure on the fluid in said circuit, force means normally urging said pressure means in said given direction to maintain said predetermined high pressure in said circuit, a second pressure fluid circuit connected with said pressure means for urging said pressure means in the other direction to relieve said predetermined high pressure in the first circuit on establishment of a predetermined pressure in said second circuit, and means for controlling the pressure in said second circuit.

6. In the arrangement claimed in claim 5, means for controllably delivering make-up fluid into said first circuit to compensate for leakage therefrom.

7. In the arrangement claimed in claim 5, a third fluid circuit automatically operable to deliver make-up fluid into said first circuit when the pressure in the first circuit falls below a predetermined low value.

8. In the arrangement claimed in claim 5, a third fluid circuit automatically operable to deliver make-up fluid into said first circuit whenever said pressure means has been moved in said other direction a predetermined amount for relieving said predetermined pressure in the first circuit.

9. In the arrangement claimed in claim 3, means for delivering make-up fluid into said fluid line when said member defining said wall has been moved a predetermined amount outwards of said chamber to increase the volume of said chamber and reduce the pressure therein, thereby to compensate for leakage from said fluid line.

10. In the arrangement claimed in claim 3, a fluid inlet to said chamber arranged to be placed in communication with said chamber upon said member defining said wall and movable in said chamber travelling a predetermined distance outwards of said chamber, and fluid delivery means connected with said inlet.

11. In the arrangement claimed in claim 3, a fluid inlet into said chamber, means for delivering fluid under a predetermined relatively low pressure, and check valve means connecting said inlet with said delivery means and operative to permit fluid flow from said delivery means into said chamber when the pressure in said chamber has fallen below said relatively low pressure value.

12. In a machine having two elements supported for movement one relative to the other, means operatively connected to said elements and operable in two directions respectively for preventing said movement of one element relative to the other and for releasing said elements for said movement thereof, a fluid pressure device having a member movable between two positions and actuatable to a given position and to the other position concomitantly respectively with change of the fluid pressure in a selected direction and in the opposite direction, said device being connected to said means connected to said two elements for effecting operation of said connected means respectively in said two directions to prevent said relative movement and to release said elements for said relative movement upon said change of said fluid pressure in said selected direction and in the opposite direction, means defining a fluid pressure chamber, a plunger disposed in said chamber for movement thereof forwardly and reversely in said chamber with concomitant change of the pressure at a given side of said plunger respectively in said selected direction and in the opposite direction, means operatively connected to said plunger to bias said plunger to move forwardly to effect said change in said pressure in said selected direction, a fluid pressure conduit connecting said fluid pressure device to said chamber at said given side of said plunger of said chamber to effect change in pressure in said conduit and in said device in said selected direction upon said forward movement of said plunger under said bias to actuate said fluid pressure device to operate said means connecting said elements in the direction for preventing said movement of one element relative to the other, and means connected to said plunger of said chamber and operable to effect said reverse movement of said plunger against said bias to effect said change of said fluid pressure in said conduit and said device in said opposite direction to effect release of said elements for the relative movement thereof.

13. In a machine having two elements supported for movement one relative to the other, means operatively connected to said elements and operable in two directions respectively for preventing said movement of one element relative to the other and for releasing said elements for said movement thereof, a fluid pressure device having a member movable between two positions and actuatable to a given position and to the other position concomitantly respectively with increase and decrease of the fluid pressure, said device being connected to said means connected to said two elements for effecting operation of said connected means respectively in said two directions to prevent said relative movement and to release said elements for said relative movement upon increase and decrease of said fluid pressure, means defining a fluid pressure chamber, a plunger disposed in said chamber for movement thereof forwardly to reduce the volume of said chamber at a given side of said plunger and reversely to increase said volume thereof, means operatively connected to said plunger to bias said plunger to move forwardly to decrease said volume of said chamber at said given side of said plunger and to increase the pressure in said volume, a fluid pressure conduit connecting said fluid pressure device to said chamber at said given side of said plunger of said chamber so that fluid pressure is increased in said conduit and in said device upon said forward movement of said plunger under said bias to actuate said member of said device to the given position to operate said means connecting said elements in the direction for preventing movement of one element relative to the other, and means connected to said plunger of said chamber and operable to effect said reverse movement of said plunger against said bias to decrease said fluid pressure in said conduit and in said device to effect movement of the member to its other position to release said elements for movement thereof.

14. In a machine having two elements supported for movement of one relative to the other, means operatively connected to said elements and operable in two directions respectively for preventing said movement of one element relative to the other and for releasing said elements for said movement thereof, means defining a cylinder supported by one of said elements, a piston disposed in said cylinder and movable lengthwise of said cylinder between two positions, said piston being operatively connected to said means connected to said two elements for effecting operation of said connected means to prevent said relative movement of said elements upon movement of said piston to a given one of said positions and for effecting release of said elements for said relative movement thereof upon movement of said piston to said other position, means defining a fluid pressure chamber, a plunger disposed in said chamber for movement thereof forwardly to reduce the volume of said chamber at a given side of said piston of said chamber and reversely to increase said volume thereof, means operatively connected to said plunger to bias said plunger to move forwardly to decrease said volume of said chamber at said given side of said plunger, a fluid pressure conduit connected to the space of said cylinder at the side of said piston of said cylinder for effecting said movement of said piston to said given position for preventing said relative movement of said elements upon development of fluid pressure in said conduit and in said space at said side of said piston, said conduit being connected so that said fluid pressure is developed upon said forward movement of said plunger under said bias, and means connected to said plunger of said chamber and operable to effect said reverse movement of said plunger against said bias to effect increase of said volume of said chamber and concomitantly decrease of said fluid pressure in said conduit and in said space at said given side of said piston of said cylinder to effect release of said elements for said relative movement.

References Cited in the file of this patent

UNITED STATES PATENTS

| 1,054,194 | Gerdau | Feb. 25, 1913 |
| 1,460,586 | Howse | July 3, 1923 |
| 2,022,646 | Belden | Dec. 3, 1935 |
| 2,339,728 | Temple | Jan. 18, 1944 |
| 2,490,941 | Bell et al. | Dec. 13, 1949 |
| 2,636,579 | De Haas | Apr. 28, 1953 |

FOREIGN PATENTS

| 1,110,907 | France | Oct. 19, 1955 |